United States Patent [19]
Weis et al.

[11] 3,894,383
[45] July 15, 1975

[54] SPINDLE ASSEMBLY

[75] Inventors: Siegfried K. Weis, Grand Rapids; Douglas J. Van Der Meulen, Martin, both of Mich.

[73] Assignee: C. L. Frost & Son, Inc., Grand Rapids, Mich.

[22] Filed: Dec. 12, 1973

[21] Appl. No.: 426,614

[52] U.S. Cl. .................. 56/17.5; 56/295; 74/230.3
[51] Int. Cl. ............................................. A01d 55/18
[58] Field of Search .............. 56/295, 6, 255, 320.1, 56/320.2, 503, 17.5; 74/230.3, 230.8, 230.01

[56] References Cited
UNITED STATES PATENTS

| 2,669,826 | 2/1954 | Watrous | 56/295 X |
| 3,065,589 | 11/1962 | Summerour | 56/295 X |
| 3,465,508 | 9/1969 | Edwards | 56/295 |
| 3,520,120 | 7/1970 | Hardin, Jr. | 56/17.4 X |
| 3,601,958 | 8/1971 | Roof | 56/6 X |

*Primary Examiner*—Louis G. Mancene
*Assistant Examiner*—J. N. Eskovitz
*Attorney, Agent, or Firm*—Price, Heneveld, Huizenga & Cooper

[57] ABSTRACT

A spindle assembly for a rotary lawn mower wherein the mounting is formed as an integral unit from stamped sheet metal. The assembly provides means for both retaining the bearings in which the spindle is rotatably supported and a means by which the spindle is mounted to the deck of a rotary lawn mower.

16 Claims, 3 Drawing Figures

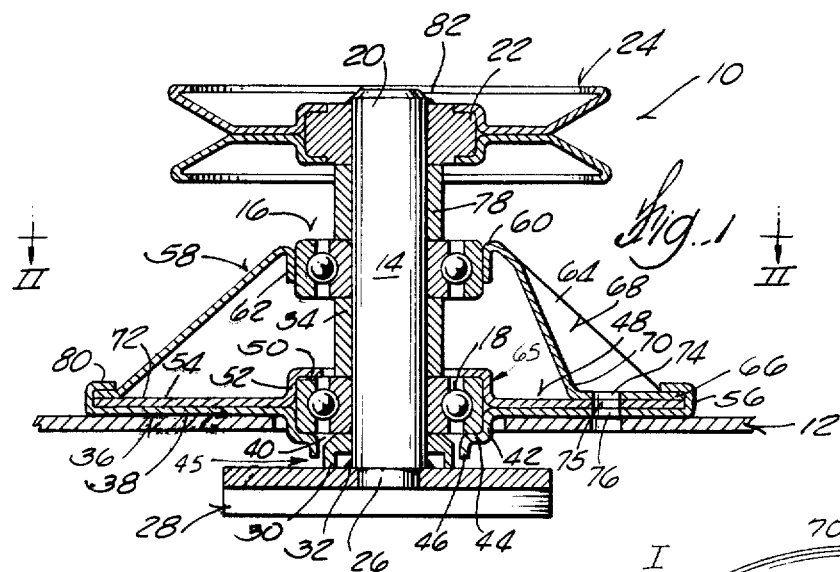
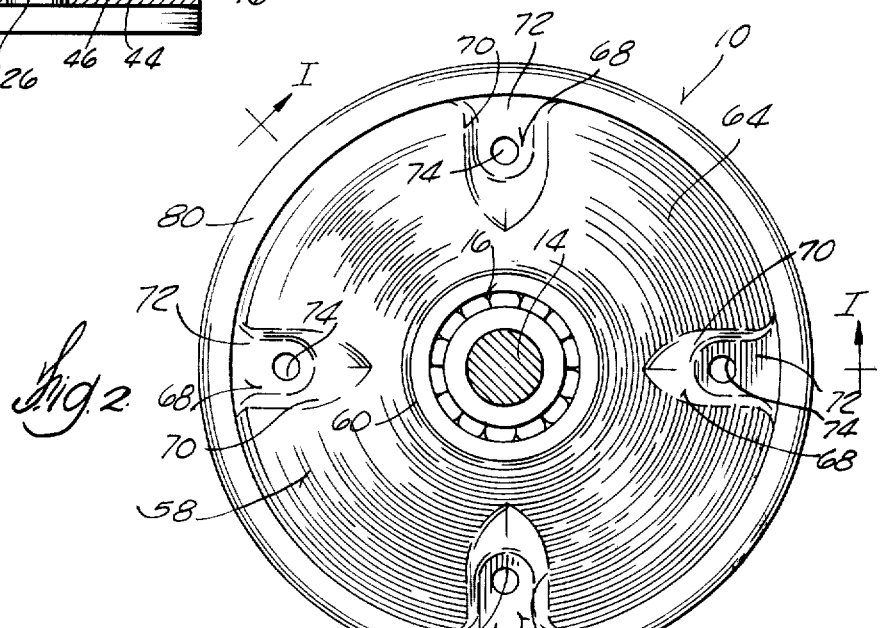
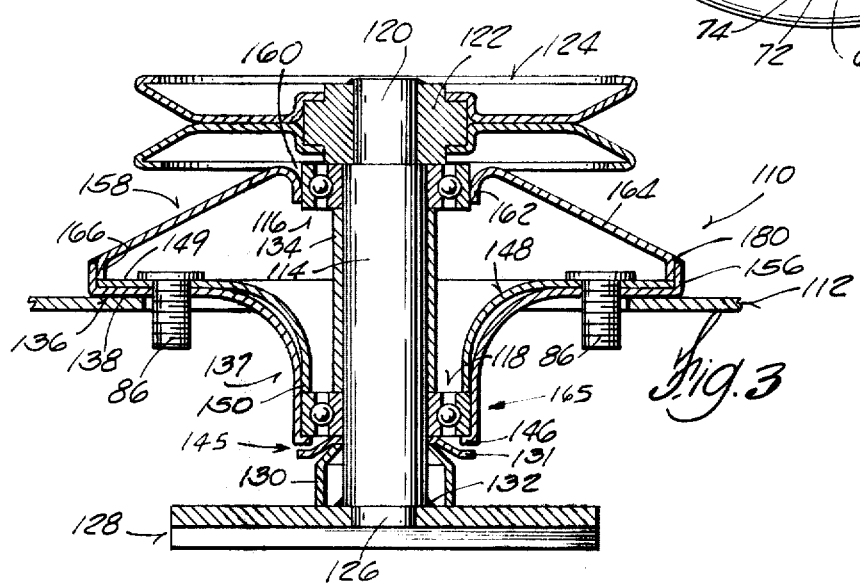

SPINDLE ASSEMBLY

BACKGROUND OF THE INVENTION

This inventnion relates to an improved rotary mower spindle assembly and more particularly, to a unique rotary mower spindle housing.

In conventional rotary mowers, the spindle housing includes a generally elongated hollow tubular member adapted at its ends to receive bearing means upon which the spindle or drive shaft is supported for rotation. In these type of structures, the bearings for the drive shaft are spaced apart in the housing and rigidly secured thereto. Alignment of the bearings with respect to each other and to the shaft is critical since misalignment can cause wobbling of the rotary blade and the resultant vibration and excessive bearing wear can result in premature failure. A related problem is the anchoring of the spindle housing to the mower deck. Previous problems in existence have resulted in premature deck failure due to the stresses and moment arms developed about the deck support depending on the length of the spindle assembly and size of the mower blade. A particular unique improvement on the conventional spindle support is disclosed in a commonly assigned application Ser. No. 426,613 filed concurrently herewith and entitled MOWER BLADE SUPPORT ASSEMBLY. Thus, there is a need in this art for an improved spindle assembly providing both economical advantages in the fabrication thereof and a significantly longer service life in the operation and maintenance of the mower.

SUMMARY OF THE INVENTION

In accordance with the invention, a unique spindle housing is formed by a frusto-conical shaped stamping which retains the spindle and its bearings and mounts them to the mower deck at two spaced points along the length of the spindle. One of the pair of spindle bearings is fixed relative to its supporting means while the opposite bearing is held but not rigidly fixed in position to allow limited movement thereof to adapt itself to the alignment of the drive shaft.

Briefly, the apparatus of the invention forms an integral housing and mounting assembly for the spindle in a rotary mower. The spindle is journaled for rotation in a pair of spaced-apart bearings. Support and spacer means for the bearings are adapted for securement to the deck of the mower frame. The support means includes a pair of members one of which engages the lower bearing and extends outwardly therefrom having a surface adapted for securement to the mower deck. A peripheral flange formed about the first member is adapted to receive and secure a second member thereto. The second member is frusto-conical in shape and is secured at its outer periphery or base to the first member. The sidewalls thereof taper upwardly to its smaller end where an opening is formed to receive the bearing supporting the upper end of the spindle. The first member forms a housing or hub around the lower bearing and secures the bearing with respect to the spindle. The upper bearing, spaced from the first by a spacer means on the spindle, is embraced by the second member at its central portion and yet is not rigidly secured thereto. Accordingly, the first and second members cooperatively form a housing to both support the bearings and spindle and also to secure the spindle to the mower deck.

The apparatus of the present invention combines the advantages of a solid spindle assembly in which the bearings are fixed in position with the advantages of a two-point spindle housing support (not heretofore known) while permitting limited movement of one of the bearings for alignment purposes. The frusto-conical housing configuration provides significant advantages over any spindle housings heretofore known in that in addition to holding the bearings, and shaft mounted therein, it distributes and alleviates the stress and moments created about the mower deck heretofore experienced in conventional arrangements. The frusto-conical configuration of the spindle housing also lends itself to fabrication by a simple stamping process which has significant economical advantages over arrangements heretofore utilized which required among other things welding of the deck bracket onto the tubular housing. The many other features and advantages of this invention will become readily apparent to those skilled in the art from a consideration of the following description when taken in connection with the accompanying drawing.

BRIEF DESCRIPTION OF THE DRAWINGS

FIG. 1 is a cross-sectional view of one embodiment of the improved spindle assembly of the invention;

FIG. 2 is a cross-sectional plan view taken generally along the plane II—II of FIG. 1; and FIG. 3 is a cross-sectional view similar to FIG. 1 illustrating an alternate embodiment of the improved spindle assembly.

DETAILED DESCRIPTION OF THE INVENTION

Referring now to FIGS. 1 and 2, the improved spindle support assembly generally designated by the numeral 10 is adapted for mounting on the deck 12 of a rotary lawn mower. A shaft or spindle 14 is journaled for rotation by means of bearings 16 and 18 held in position within spindle support assembly 10. The upper end 20 of spindle 14 is adapted to receive the hub 22 of a welded pulley assembly 24. The lower end 26 of spindle 14 is equipped with a saddle assembly 28. Saddle 28 is welded at an annular shoulder formed on shaft 14 and includes an annular spacer 30 having a cavity formed therein to receive the weld 32 by which saddle 28 is secured to spindle 14. The welded spindle and saddle assembly, including spacer 30 is described in detail in commonly assigned U.S. Letters Pat. No. 3,847,455 issued Nov. 12, 1974 entitled MOWER BLADE SADDLE ASSEMBLY to which reference may be had for a detailed description thereof. Similarly, pulley 24 including its welded hub 22 may be constructed in accordance with the teachings of commonly assigned, co-pending application Ser. No. 199,983, filed Nov. 18, 1971, entitled ROTATABLE MEMBER ASSEMBLY AND METHOD OF MAKING SAME. Other types of pulley and blade saddle arrangements could be used however.

Bearings 16 and 18 are spaced apart along the length of shaft 14 by a tubular spacer 34 fitted over shaft 14 and abutting the inner race of bearings 16 and 18 for rotation therewith.

Referring to FIG. 1, spindle support assembly 10 comprises a number of separate members inexpensively formed from sheet metal and secured together. The first mounting member 36 includes a flat planar mounting surface 38 adapted for positioning in abutment with deck 28 of a rotary mower. Mounting member 36 is preferably disk-shaped, having an opening 40 in its central portion. A series of steps formed by a downwardly depending wall 42, an inwardly directed wall 44, and a downwardly depending lip or flange 46 define one-half of a cup-like housing 65 in which lower bearing 18 is supported. The opposite half of the bearing cup 65 is formed in an intermediate mounting member 48. Intermediate member 48 is also disk-shaped, having a central opening defined by an inwardly directed flange 50 and a downwardly formed wall 52 from which a flat planar surface 54 extends radially outwardly into abutment with a peripheral wall 56 formed at the outer periphery of mounting member 36. The third support member 58 is frusto-conical in shape, having a central opening 60 formed at its smaller end. Opening 60 is formed with an annular central flange or neck 62 surrounding the outer race of upper bearing 16. Support member 58 is drawn or stamped from sheet metal so as to include central flange 62 and outwardly and downwardly extending side walls 64 extending outwardly to form a radial foot or lip 66 extending into abutment with wall 56 formed at the outer periphery of mounting member 36. Side walls 64 are formed with a plurality of spaced apart stiffening ribs 68. Ribs 68 include a back wall surface 70 depending from flange 62 at an angle with respect to a vertical defined by shaft 14 slightly less than the angle of side wall 64. Ribs 68 terminate at their outer peripherial end in flattened areas or mounting pads 72. Openings 74 formed in mounting pads 72 are in alignment with openings 75 in intermediate member 48 and openings 76 in the mounting member to receive fastening means by which the spindle support assembly 10 is mounted to deck 12. Mounting member 36, intermediate member 48, and support member 58 are secured together by an inwardly turned lip 80 which extends radially inwardly from peripheral wall 56 of mounting member 36.

When spindle 14 is assembled with housing 10, a second tubular spacer 78 may be positioned between hub 22 of pulley 24 and the top surface of the inner race of upper bearing 16 to thereby position pulley 24 with respect to deck 12.

Referring back to FIG. 1, the depending lip 46 of mounting member 36 provides an additional significant function not heretofore taught in the prior art. The spacer 30 which rotates jointly with spindle 14 and the inner race of bearing 18 fits up within and in close proximity to lip 46. The spacer in fact abuts the inner race of the bearing and the only way for grass clippings or the like to find ingress into the bearing is through the gap 45 between spacer 30 and lip 46. Although shown for purposes of the drawing to be somewhat spaced, this gap is on the order of 0.001 and 0.003 inches. Lip 46 acts a cutter relative the spring of spacer 30 and for all practical purposes prevents entry of any grass or the like into the bearing. Thus, the bearing is in effect shielded from the grass and the like by a cutter formed on the end of the mounting member 36.

ASSEMBLY

The method of assembly of the housing and spindle will be evident to those skilled in the art. However, for clarity, it will be briefly described. Basically, to assemble the structure, the first mounting member and intermediate members 36 and 48 are placed in the position shown and spot welded (not shown) or otherwise joined together preferably around the bearing cup 65. This face clamps bearing 18 into place. The third support member 58 is then positioned in place and wall 56 is deformed to form the inwardly turned lip 80 to secure the elements in place. The subassembly such as spindle 14 and attached blade saddle 28 and spacer 30 are inserted up through the bearings from the bottom while spacer 34, bearing 16, spacer 78, and pulley 24 are positioned over shaft 14 where they are secured in place by a 360° weld 82 around shaft 14 and hub 22. It will, of course, be realized that conventional keyways, set screws or the like may also be utilized to secure the pulley 24 to shaft 14 and to also hold the bearing and spacers in position. It will be noted that bearing 16 is held in position by support 58 and yet is not secured thereto. This allows for slight deflection or lateral movement of the bearing with respect to the housing and the resultant slight movement of shaft, should it become necessary to correct misalignment or to accommodate other manufacturing tolerances. The spindle 14, however, is relatively fixed with respect to the housing at two spaced-apart points to thereby hold the spindle, bearings, and the housing in perpendicular relationship with respect to deck 12.

The integral assembly thus formed, cooperatively provides an extremely strong mounting assembly in which fatigue and breakage problems of the prior art are entirely eliminated. The construction of the mounting is relatively inexpensive, both in cost of the materials and in the labor involved in assembly. The requirements for heavy, machined parts or castings has been entirely eliminated thereby markedly reducing the cost of the mounting assembly.

A slightly modified alternate embodiment of this invention is shown in FIG. 3 wherein generally corresponding parts are identified with similar reference numerals prefixed by the numeral 100. The alternate assembly of FIG. 3 basically includes a shaft 114 to which a saddle 128 is secured by a weld 132 at one end and includes a spacer 130 and a shield 131, abutting the inner race of lower bearing 118. The upper end of spindle 114 is journaled in an upper bearing 116 and includes pulley 124 secured at the upper end of shaft 114 by its hub 122. A tubular spacer 134 abutting the inner races of bearings 116 and 118 holds the bearings in a spaced-apart relationship with respect to the shaft.

The housing assembly, generally designated by the numeral 110 includes a first mounting member 136, an intermediate member 148, and an upper bearing support member 158. Mounting member 136 is formed to include an elongated downwardly extending annular wall 137 having an inwardly turned lip 146 formed at its lower extremity. Bearing 118 is positioned on lip 146 such that its outer race abuts the lower extremity of wall 137. Bearing 118 is held in position in mounting member 136 and against lip 146 by a downwardly extending terminal end 150 of intermediate member 148.

Thus, intermediate member 148 and mounting member 136 also form a cup 165 for indexing and positioning the lower bearing 118 in similar fashion to bearing cup 65 in the embodiment of FIG. 1. Member 148 includes a flat mounting surface 149 extending radially outwardly into abutment with a peripheral wall 156 formed at the outer diameter of mounting member 136. Support member 158 is formed with a central opening defined by inwardly turned flange 162. Support member 158 is generally cone-shaped including angularly outwardly extending side walls 164 terminating in a downwardly directed flange 166 which closely fits in peripheral wall 156 of mounting member 136. Support member 158 is secured to mounting member 136 which in turn positions and secures intermediate member 148 by a weld 180 at the interface of flange 156 and the side wall 164.

As noted previously regarding the embodiment of FIG. 1, the lower lip 146 of mounting member 136 acts as a cutter to prevent ingress of grass clippings into bearing 118. Due to the configuration of mounting member 136, a separate shield 131 is provided. This rotates with spindle 114 and spacer 130 causing a cutting effect on lip 146.

Suitable openings are provided in the intermediate member 148 and mounting member 136 to receive studs 86 or the like for mounting the assembly to the deck 112 of the lawn mower. Preferably, studs 86 are projection welded into the intermediate member 148 and extend through mounting member 136 and deck 112 where suitable fastening means is utilized to secure the assembly to the lawn mower deck. In this embodiment as in the previous embodiment, the upper bearing 116 is not secured to the housing and remains free to float laterally as required to compensate for manufacturing tolerances and to prevent misalignment of the spindle with respect to the deck.

The construction of the alternate mounting is also relatively inexpensive in material and in labor costs. As in the previous embodiment, the requirement for heavy expensive machine parts or castings has been eliminated thereby reducing the cost of the assembly.

Those skilled in the art will immediately recognize that the spindle mounting arrangements known in the prior art have been significantly improved upon by the teachings of the present invention. Those skilled in the art will also appreciate that many modifications may be made and it is intended that the equivalent arrangements be included as part of this invention unless the following claims by their wording expressly state otherwise.

The embodiments of the invention in which an exclusive property or privilege is claimed are defined as follows:

1. A spindle housing comprising, in combination: an upper and lower housing and support means for supporting a rotary mower spindle, said lower housing support means comprising first and second annular members having central openings formed therein, bearing means mounted in said central opening, said bearing means including an inner and outer race spaced by an anti-friction means, the outer race of said bearing means being clamped in engagement means formed at said central opening on said first and second annular members, said upper housing and support means comprising an annular member having a central opening spaced above said other central openings, said upper housing and support means including engagement means formed thereon at said central opening for embracing and solely supporting an outer periphery of an outer race of an upper bearing means for allowing a vertical component of movement therebetween, said upper and lower support means extending radially to a common locus and being interconnected to each other to form said pre-assembled spindle housing, one of said upper and lower housing and support means having a surface portion adapted for securement to a mower deck.

2. The apparatus of claim 1 wherein said engagement means on said lower housing support means provide a housing for said bearing means which indexes and holds said bearing means in positive fashion.

3. The apparatus of claim 2 wherein said upper housing and support means is frusto-conical in configuration, the small end thereof having an annular inwardly directed flange formed therein surrounding said central opening, the walls forming said upper housing engagement means.

4. The apparatus of claim 3 wherein said upper housing and support means and at least one of said first and second members extending radially outwardly from said housing, said members each having a generally flat planar area forming said surface portion for securement to a lawn mower deck, said surface portion having a plurality of spaced-apart openings formed therein to receive fastening means for securing said members to said deck.

5. The apparatus of claim 3 wherein said upper housing and support means and at least one of said first and second members are each frusto-conical in configuration.

6. The apparatus of claim 1 and further including a means affixed to the lower end of said spindle for attaching a mower blade thereto; a spacer means intermediate said bearing means and said means, said spacer means rotating jointly with said spindle and means, said outer peripheral flange of said first member having an edge means in close proximity to said spacer means and cooperating with said spacer means to prevent the entrance of contaminating materials into said bearing means.

7. The apparatus of claim 6 wherein said spacer means is a one-piece element in abutment with said bearing means and said means.

8. The apparatus of claim 6 wherein said spacer means includes a shield in abutment with said bearing means, said shield extending radially from said spindle to said outer peripheral flange of said first member.

9. A spindle housing assembly for a rotary mower comprising, in combination: an upper and lower bearing means having inner and outer races spaced by anti-friction means, said bearing means being spaced by a spacer tube abutting said inner races, a spindle rotatably mounted in said bearing means, a drive pulley affixed to the upper end of said spindle and blade support means affixed to the lower end of said spindle, first and second support means having a central opening formed therein, said means including engaging means at said central openings whereby the outer race of said lower bearing means is clamped therebetween, and a third support means having a central opening formed therein and extending radially from said spindle, said third support means including engaging means at said central opening embracing and solely supporting the outer periphery of the outer race of said upper bearing means but permitting a vertical component of movement therebetween, said third support means and at least one of said first and second support means terminating radially outwardly at a common locus and being interconnected to each other forming a spindle support and housing, one of said members having a surface portion adapted for securement to the mower deck.

10. The rotary drive assembly of claim 9 wherein said one of said radially extending first and second members is disk-shaped; and wherein said third member is frusto-conical in configuration, the small end thereof having said annular shoulder formed therein.

11. The rotary mower drive assembly of claim 9 wherein said one of said first and said second members and said third member are each frusto-conical in configuration, the bases of said members being fixed in abutting relationship, the small ends thereof extending in opposite directions to thereby support said bearing means along the length of said shaft.

12. The rotary mower drive of claim 9 wherein said upper bearing means is fixed relative to said deck in said first and second member and wherein said upper bearing means is embraced by said third member for limited movement with respect to said deck to thereby compensate for misalignment of said bearing means, with respect to said shaft and said deck.

13. The apparatus of claim 9 and further including a means affixed to the lower end of said spindle for attaching a mower blade thereto; a spacer means intermediate said lower bearing means and said means, said spacer means rotating jointly with said spindle and means, one of said first and second members having an outer peripheral flange with an edge means in close proximity to said spacer means and cooperating with said spacer means to prevent the entrance of contaminating materials into said lower bearing means.

14. The apparatus of claim 13 wherein said spacer means is a one-piece element in abutment with said lower bearing means and said means.

15. The apparatus of claim 13 wherein said spacer means includes a shield in abutment with said lower bearing means, said shield extending radially from said spindle to said outer peripheral flange of said one of said first and second member.

16. A spindle housing comprising, in combination: an upper and lower housing and support means for supporting a rotary mower spindle, said lower housing support means comprising an annular member having a central opening formed therein, bearing means mounted in said central opening, said bearing means including an inner and outer race spaced by an anti-friction means, the outer race of said bearing means being clamped in engagement means formed at said central opening on said annular member, said upper housing and support means comprising an annular member having a central opening spaced above said other central opening, said upper housing and support means including engagement means formed thereon at said central opening for embracing and solely supporting an outer periphery of an outer race of an upper bearing means for allowing a vertical component of movement therebetween, said upper and lower support means extending radially to a common locus and being interconnected to each other to form said pre-assembled spindle housing, one of said upper and lower housing and support means having a surface portion adapted for securement to a mower deck.

* * * * *